United States Patent
Shen

(10) Patent No.: US 11,997,484 B2
(45) Date of Patent: May 28, 2024

(54) SIM CARD SHARING METHOD AND DEVICE, COMMUNICATION DEVICE AND STORAGE MEDIUM

(71) Applicant: BEIJING XIAOMI MOBILE SOFTWARE CO., LTD., Beijing (CN)

(72) Inventor: Honggang Shen, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 188 days.

(21) Appl. No.: 17/515,054

(22) Filed: Oct. 29, 2021

(65) Prior Publication Data
US 2022/0386119 A1    Dec. 1, 2022

(30) Foreign Application Priority Data
May 26, 2021 (CN) .......................... 202110578623.7

(51) Int. Cl.
*H04W 12/06* (2021.01)
*H04W 8/20* (2009.01)
*H04W 76/10* (2018.01)

(52) U.S. Cl.
CPC .......... *H04W 12/06* (2013.01); *H04W 8/205* (2013.01); *H04W 76/10* (2018.02)

(58) Field of Classification Search
CPC ..... H04W 8/205; H04W 76/10; H04W 12/06; H04W 12/43; H04W 88/02
See application file for complete search history.

(56) References Cited

U.S. PATENT DOCUMENTS

| | | | |
|---|---|---|---|
| 11,388,599 B2* | 7/2022 | Liu | H04W 4/00 |
| 2015/0237496 A1 | 8/2015 | Gao et al. | |
| 2018/0234833 A1 | 8/2018 | Tang et al. | |
| 2021/0051470 A1* | 2/2021 | He | H04W 12/45 |
| 2021/0076195 A1* | 3/2021 | Chaugule | H04W 12/40 |
| 2021/0076204 A1* | 3/2021 | Goyal | H04L 67/306 |
| 2021/0282103 A1* | 9/2021 | Zhu | H04W 76/15 |
| 2021/0360387 A1* | 11/2021 | Obaidi | H04W 12/35 |
| 2021/0385645 A1* | 12/2021 | Cha | G06F 1/1656 |
| 2022/0007174 A1* | 1/2022 | Li | H04W 12/06 |

(Continued)

FOREIGN PATENT DOCUMENTS

| | | |
|---|---|---|
| EP | 1689199 A1 | 8/2008 |
| EP | 3139648 A1 | 3/2017 |

OTHER PUBLICATIONS

Extended European Search Report issued in Application No. 21212523.1, dated May 23, 2022, (10p).

*Primary Examiner* — Khawar Iqbal
(74) *Attorney, Agent, or Firm* — Arch & Lake LLP

(57) ABSTRACT

The present disclosure relates to a SIM card sharing method and device, a communication device, and a storage medium. The SIM card sharing method applied to the first device may include: in response to the first device's requirement for obtaining cellular mobile communication, sending share request information to a second device through an interactive channel, where the interactive channel is established between the first device and the second device through a preset connection manner; receiving SIM card information that is returned by the second device based on the share request information; and establishing a cellular mobile communication connection with the base station according to the SIM card information.

14 Claims, 10 Drawing Sheets

(56) References Cited

U.S. PATENT DOCUMENTS

| | | | |
|---|---|---|---|
| 2022/0330352 A1* | 10/2022 | Horn | H04L 63/0281 |
| 2023/0018945 A1* | 1/2023 | Chaugule | H04W 12/40 |
| 2023/0036384 A1* | 2/2023 | Touati | H04W 4/50 |
| 2023/0037475 A1* | 2/2023 | Liu | H04W 8/18 |
| 2023/0276510 A1* | 8/2023 | Cheng | H04W 48/20 |
| | | | 370/329 |

* cited by examiner

SIM CARD SHARING METHOD AND DEVICE, COMMUNICATION DEVICE AND STORAGE MEDIUM

CROSS-REFERENCE TO RELATED APPLICATION

The present application is based on and claims priority to Chinese Patent Application No. 202110578623.7 filed on May 26, 2021, the disclosure of which is incorporated herein by reference in its entirety for all purposes.

TECHNICAL FIELD

The present disclosure relates to the field of communication technologies, and in particular to a SIM (Subscriber Identity Module) card sharing method and device, a communication device, and a storage medium.

BACKGROUND

A SIM card is generally required for communication during a process of cellular mobile communication. The SIM card may be a physical tangible card that can be separated from the device or an embedded SIM (eSIM) card. In this way, the cellular mobile communication cannot be performed if there is no SIM card in the device or the SIM card is abnormal.

SUMMARY

Examples of the present disclosure provide a SIM card sharing method and device, a communication device, and a storage medium.

A first aspect of the present disclosure provides a SIM card sharing method that is applied to a first device, and the method includes: in response to the first device's requirement for obtaining cellular mobile communication, sending share request information to a second device through an interactive channel, where the interactive channel is established between the first device and the second device through a preset connection manner; receiving SIM card information that is returned by the second device based on the share request information; and establishing a cellular mobile communication connection with a base station according to the SIM card information returned by the second device.

A second aspect of the present disclosure provides a SIM card sharing method that is applied to a second device, and the method includes: receiving share request information sent, through an interactive channel, by a first device, where the share request information is configured to request the SIM card information of the second device, and the interactive channel is established between the first device and the second device through a preset connection manner; in response to the share request information, returning the SIM card information to the first device through the interactive channel, where the SIM card information is at least configured to allow the first device to establish a cellular mobile communication connection with a base station.

A third aspect of the present disclosure provides a SIM card sharing device, applied to a first device and comprising: a processor and a memory, wherein the memory is configured to store a computer program that, when executed by the processor, causes the processor to: in response to the first device's requirement for obtaining cellular mobile communication, send share request information to a second device through an interactive channel, wherein the interactive channel is established between the first device and the second device through a preset connection manner; receive SIM card information that is returned by the second device based on the share request information; and establish a cellular mobile communication connection with a base station according to the SIM card information returned by the second device.

BRIEF DESCRIPTION OF THE DRAWINGS

The drawings herein are incorporated into the specification and constitute a part of the specification, show examples consistent with the disclosure, and are used to explain the principles of the disclosure together with the specification.

DETAILED DESCRIPTION

Figure 1:
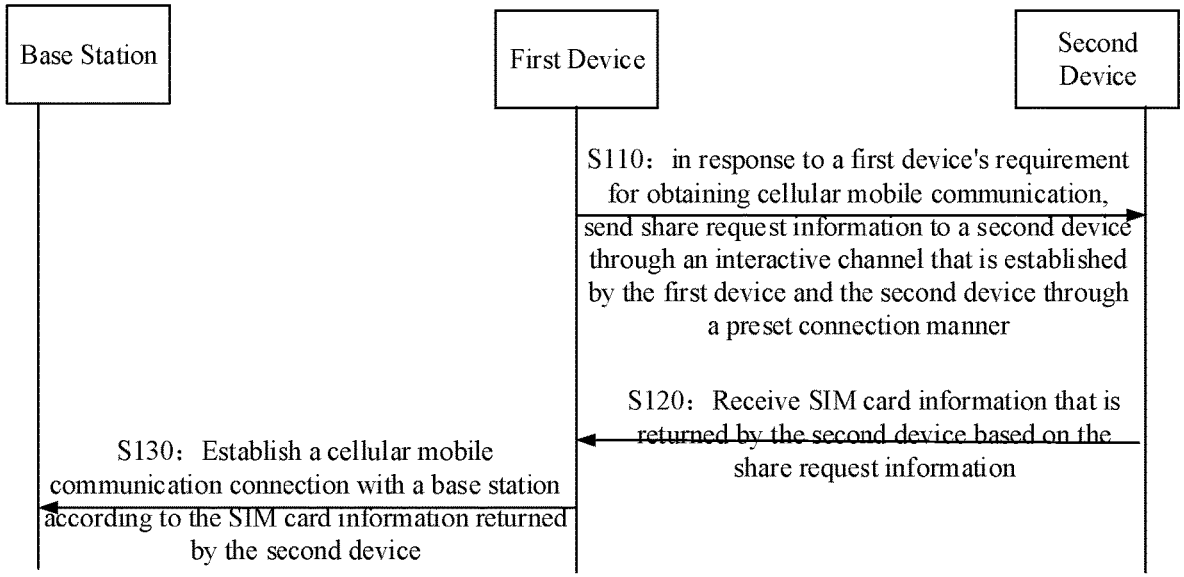
FIG. 1 is a schematic flowchart of a SIM card sharing method according to one or more examples of the present disclosure.

The exemplary embodiments will be described in detail here, and examples of the embodiments are shown in the accompanying drawings. When the following description refers to the drawings, unless otherwise indicated, the same signs in different drawings indicate same or similar elements. The implementation manners described in the following exemplary embodiments do not represent all implementation manners consistent with the present disclosure. On the contrary, they are merely examples of devices and methods consistent with some aspects of the present disclosure as recited in the appended claims.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

As shown in FIG. 1, examples of the present disclosure provide a SIM card sharing method applied to a first device, and the method includes steps described below.

In S110, in response to a first device's requirement for obtaining cellular mobile communication, share request information is sent to a second device through an interactive channel that is established between the first device and the second device through a preset connection manner.

In S120, SIM card information that is returned by the second device based on the share request information is received.

In S130, a cellular mobile communication connection with a base station is established according to the SIM card information returned by the second device.

The first device in the examples of the present disclosure may be a device including a modem. The modem can be used for signal modulation and demodulation for cellular mobile communications. The device type of the first device may include: a mobile phone, a tablet phone, a phone watch, a vehicle-mounted device, or other communicable devices.

In some examples, the first device may also be a device installed with an application program and/or middleware for sharing a SIM (Subscriber Identity Module) card of another device.

The SIM card herein can also be called as a smart card. The SIM card described in the examples of the present may be a standard card, a micro SIM card, a Nano SIM card, or an embedded SIM card and the like.

The SIM card information herein can be information about the SIM card.

The SIM card information received by the first device in S120 may be: all SIM card information of the SIM card of the second device, or part of the SIM card information of the SIM card of the second device.

The SIM card information of the second device includes but is not limited to elementary file (EF) information of the SIM card of the second device. In some examples, the SIM card information may at least include international mobile subscriber identity (IMSI) of the SIM card of the second device required by the first device to send a network access request. The IMSI herein may be the identity written into the SIM card of the second device by the network side of the cellular mobile communication after the SIM card of the second device is registered to the network (that is, after the SIM card is activated).

In some examples, the SIM card information may further include information indicating a communication provider of the SIM card of the second device.

For example, the SIM card information may include: an integrated circuit card identity (ICCID). After receiving the ICCID of the SIM card of the second device, the first device can learn the information of the communication provider of the SIM of the second device, so as to know with which communication provider's base station a cellular mobile communication connection is to be established.

As another example, the SIM card information may further include indication information of a communication provider.

In some examples, if the second device shared it's SIM card with the first device for use, then there is a sharing record or pre-negotiated information between the first device and the second device. In this case, when the first device needs to establish cellular mobile communication connection, there is no need for the first device to temporarily request the information of the communication provider of the SIM card of the second device.

In the examples of the present disclosure, the first device will request the SIM card information from the second device and share the SIM card information of the second device to establish cellular mobile communication with the base station. In this way, the first device can share the SIM card information of the second device without disassembling the SIM card of the second device and installing the SIM card on the first device, thereby expanding the capability of the first device to perform cellular mobile communications. In another scenario, when the local communication of the first device is abnormal, the terminal device can use the SIM card information of other devices to perform cellular mobile communication without plugging or unplugging the SIM card. This method not only expands the communication capability of the first device, but also determines whether the device itself is abnormal or the SIM card is abnormal, so that it can be used to assist the first device in locating abnormal in the cellular mobile communications.

The SIM card information may be used by the first device to realize the network access of the first device through information exchange with the base station. After accessing the network, the first device will directly establish a cellular mobile communication connection with the base station. The first device can exchange information with the base station based on the cellular mobile communication connection.

In the examples of the present disclosure, by obtaining the SIM card information of the second device, the first device achieves an effect of sharing the SIM card of the second device. Therefore, when the expression of "sharing SIM card" is described in the following examples, unless it is specially explained, it can be regarded as sharing the SIM card information as recited in the examples of the present disclosure.

Figure 2A:
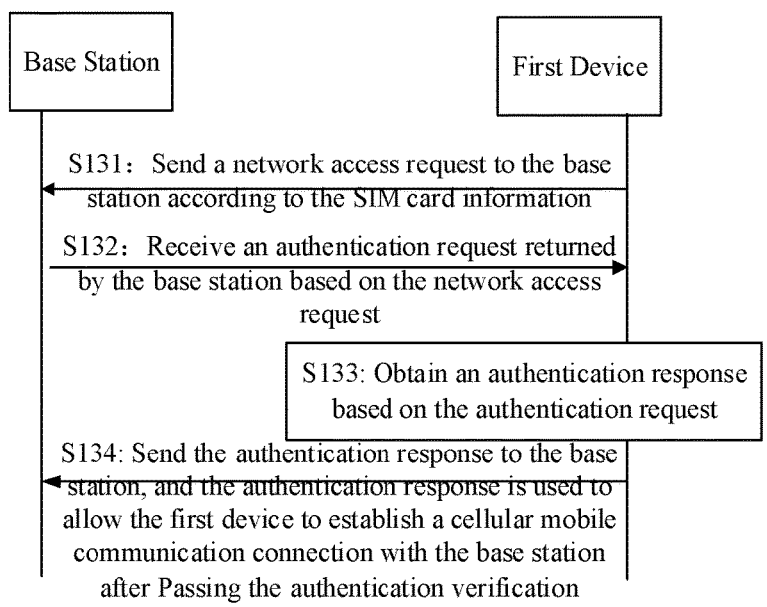
FIG. 2A is a schematic flowchart of a SIM card sharing method according to one or more examples of the present disclosure.

The detail process of establishing, based on the SIM card information of the second device, a cellular mobile communication connection between the first device and the base station may refer to a network access registration process in the related technology. An optional network access registration process is provided below. That is, the S130 may include steps described below, as shown in FIG. 2A.

In S131, a network access request is sent to the base station according to the SIM card information.

In S132, an authentication request that is returned by the base station based on the network access request is received.

In S133, an authentication response is obtained based on the authentication request.

In S134, the authentication response is sent to the base station, and the authentication response is used to allow the first device to establish a cellular mobile communication connection with the base station in response to the authentication response passing an authentication verification.

For example, the network access request sent to the base station from the first device may at least include: the IMSI of the SIM card of the second device.

After receiving the network access request, the base station sends the authentication request to the first device, and information required for authentication is carried in the authentication request.

For example, the authentication request may carry a random number (RAND) and a network authentication token (AUTN) generated by the network side.

After receiving the authentication request, the first device needs to obtain the authentication response based on the authentication request.

For example, the authentication response at least includes: calculating an authentication response (RES) according to the authentication request and an authentication key (Ki) in the SIM card information.

If the SIM card of the second device is a registered SIM card, the Ki of the SIM is written to the SIM card of the second device by the network side. Exemplarily, the RES calculated in the authentication response is consistent with the RES calculated by the network side.

In some examples, the EF information of the EF file may include at least one of: IMSI and/or ICCID and/or Ki of the second device.

In the examples of the present disclosure, the first device returns the RES to the base station after obtaining the RES. The base station can determine whether the authentication is passed based on the received RES. If the authentication is passed, it means that the base station allows the first device to access the network based on the SIM card information of the second device. At this time, the first device can establish cellular mobile communication with the base station based on the SIM card information of the second device. If the first device establishes a cellular mobile communication connection with the base station by sharing the SIM card information of the second device, wireless communication can be performed based on the cellular mobile communication connection.

The aforementioned interactive channel may be any channel that can allow the first device and the second device to exchange information, which is established in a preset connection manner. For example, the preset connection manner may be any connection establishment manner other than that used for establishing a cellular mobile communication connection.

Herein, the interactive channel established in the preset connection manner may include, but is not limited to: a link established through a related technology of the preset connection. The link can be used to exchange and share any information of the SIM card information between the first device and the second device.

In the examples of the present disclosure, the preset connection may be any connection established between the first device and the second device, which is different from the cellular mobile communication connection. The interactive channel established through the preset connection can be used to exchange any information of the SIM card of the second device between the first device and the second device.

In the examples of the present disclosure, if the first device includes a modem, it can use the SIM card information of the second device to establish cellular mobile communication with the base station. Therefore, when no physical SIM card or no eSIM card is installed in the first device, or when the SIM card installed in the first device is abnormal and cannot be used directly, the first device may use the SIM card of the second device for cellular mobile communication.

In the examples of the present disclosure, the first device can use the SIM card information of the second device to perform cellular mobile communication, which is equivalent to improving the cellular mobile communication capability of the first device and increasing scenes where the first device can perform cellular mobile communication, and the first device's cellular mobile communication range is improved.

In some examples, when the first device desires to share the SIM card information of the second device, share authentication for the SIM card information must be performed first. For example, the first device may establish a share authentication negotiation with the second device in advance, and after the negotiation, both the first device and the second device can store the authentication information about the share authentication. When the first device requests the second device for the SIM card information of the second device, the authentication information about the share authentication may be carried. After receiving the share request information of the SIM card information, the second device authenticates the authentication information about the share authentication first. If the authentication is passed, the SIM card information of the second device will be shared with the first device, so as to ensure the security of the SIM card information of the second device.

In some examples, the authentication information about the share authentication may include at least one of the following:
an authentication code pre-negotiated by the first device and the second device;
a device identity of the first device, for example, including but not limited to: international mobile equipment identity (IMEI);

the device identity of the first device and the device identity of the second device, for example, both the device identity of the first device and the second device may be their respective IMEI;

an authentication password received by the first device and the second device from an human-computer interaction interface;

authentication information generated by the first device based on an authentication factor and a preset algorithm pre-negotiated with the second device.

Figure 2B:
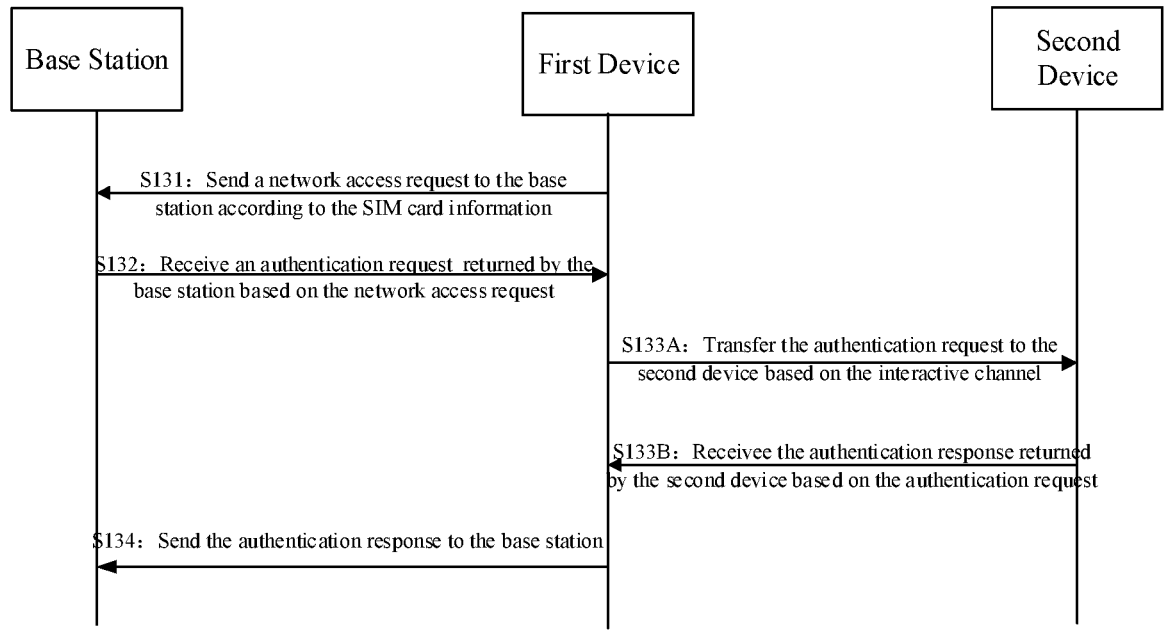
FIG. 2B is a schematic flowchart of a SIM card sharing method according to one or more examples of the present disclosure.

In some examples, as shown in FIG. 2B, the step S133 may include:

S133A, transferring the authentication request to the second device based on the interactive channel;

S133B, receiving the authentication response returned by the second device based on the authentication request.

For example, the SIM card information sent by the second device may be partial information of the SIM card of the second device. In this case, the authentication response still needs to be generated by the second device.

Therefore, in the present example of the disclosure, after receiving the authentication request, the first device transfers the authentication request to the second device through the interactive channel. After receiving the authentication request, the second device calculates information required for the authentication response based on a part of the SIM card information of the second device that is not sent to the first device, and sends the generated authentication response to the first device through the interactive channel. In this way, the first device will obtain the authentication response generated by the second device by transferring the authentication request and receiving the authentication response.

In some examples, the first device may receive all the SIM card information required to generate the authentication response from the second device. In this case, the first device may generate the authentication response by itself after receiving the authentication request.

Figure 2C:
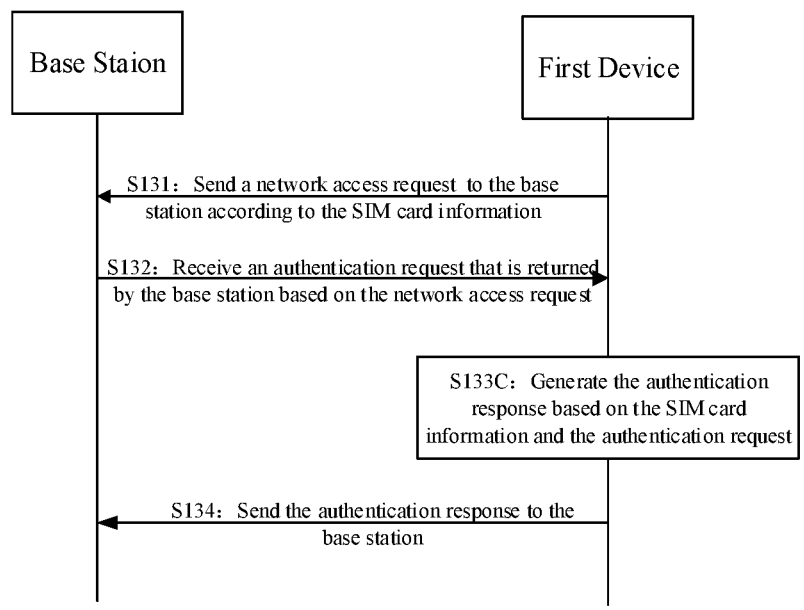
FIG. 2C is a schematic flowchart of a SIM card sharing method according to one or more examples of the present disclosure.

As shown in FIG. 2C, the step S133 may include:

S133C, generating the authentication response based on the SIM card information and the authentication request.

In the examples of the present disclosure, the first device obtains the authentication response in at least two achievable manners: receiving the authentication response from the second device or generating the authentication response by itself. In some cases, the manner in which the first device obtains the authentication response is not limited to the examples listed here.

In some examples, the situations where the first device has cellular mobile communication requirements includes at least one of the following:

the first device enters a Share-SIM client mode;

the first device receives a sharing command for sharing the SIM card;

an instruction to perform cellular mobile communication is received by the first device when there is no available SIM card in the first device.

The Share-SIM client mode may be a work mode in which the first device performs cellular mobile communication by using SIM card information of another device. The work mode may include the work mode that the first device enters when there is no available SIM card and there is a need for cellular mobile communication. Therefore, when the first device enters the Share-SIM client mode, it can be determined that the first device currently has cellular mobile communication requirements.

As an example, the first device may be installed with a sharing code such as an application (APP) used for sharing a SIM card, and the sharing code may provide a user interface, and the user interface may receive an instruction for instructing the first device to enter the Share-SIM client mode. If the instruction is received, the first device enters the Share-SIM client mode.

In some examples, the first device may be installed with an application (APP) used for sharing the SIM card. If the user interface of the APP receives the sharing command, it can be considered that the first device shares the SIM card information of another device to achieve the requirements for cellular mobile communications.

In some other examples, when there is no available SIM card in the first device, the received instruction for cellular mobile communication may include at least one of the following:

an instruction to initiate a call;

an instruction to send short messages;

an enabling instruction for using the mobile data, the enabling instruction includes, but is not limited to an instruction acted on a virtual control for enabling or disabling the mobile data in the system message bar;

a received instruction to use the mobile data, and the instruction includes but is not limited to: a confirmation instruction to use the mobile data, which pops up in the interface of the webpage and/or the application.

In response to detecting any conditions where the cellular mobile communication is required by the first device and the first device cannot perform the cellular mobile communication by itself, it can be considered to detect that the first device needs to use the SIM card information of another device to perform the cellular mobile communication.

In some examples, if the first device receives an instruction to enter the Share-SIM client mode while having no available SIM card, it also indicates that the first device needs to use the SIM card information of the second device for cellular mobile communication.

If the first device receives an instruction to enter the Share-SIM client mode while having an available SIM card, it indicates that the first device can perform the cellular mobile communication by itself without using the SIM card information of the second device.

To sum up, in the examples of the present disclosure, the first device can send the share request information for requesting the SIM card information to the second device when there is any need to use the SIM card information of the second device for cellular mobile communication.

In the examples of the present disclosure, after receiving the instruction to perform cellular mobile communication, the first device establishes cellular mobile communication with the base station by using the SIM card information of the second device, and after establishing a cellular mobile communication connection, executes the above instruction based on the established cellular mobile communication connection, such as initiating a call, sending a short message, and/or transmitting mobile data.

In some examples, the situation that there is no available SIM card in the first device includes at least one of the following scenarios:

no SIM card is installed in the first device;

the SIM card installed in the first device is in a deactivated state;

the SIM card installed in the first device breaks down;

the SIM card installed in the first device is not registered.

If no SIM card is installed in the first device or the installed SIM card is abnormal, it means that the first device has no available SIM card.

The abnormality of the SIM card herein includes but is not limited to: abnormality of the physical chip of the SIM card and/or abnormality of the code operated in the SIM card, etc. Of course, this is only an example for the abnormality of the SIM card, and the specific implementation is not limited to these examples. Exemplarily, the abnormality of the SIM card may also include abnormalities such as arrears in a communication account corresponding to the SIM card.

If the first device is installed with a SIM card that has not yet been registered to the network, it means that the SIM card installed in the first device has not yet sent a registration request to the network. At this time, the SIM card information such as IMSI and/or Ki has not yet been written into the SIM card in the first device. Therefore, the SIM card of the first device is also unavailable.

If the first device is installed with a SIM card that has been registered to the network and currently set in a deactivated state by the first device, the SIM card of the first device is in an inactive state. In this case, the first device does not have an available SIM card either.

In some examples, the method further includes:
in response to the first device entering the Share-SIM client mode, determining whether there is an available SIM card in the first device; and
in response to determining that there is an available SIM card in the first device, deactivating the available SIM card in the first device.

If the first device switches to the Share-SIM client mode currently, it is determined whether the first device has an available SIM card. If the first device has an available SIM card, the first device can establish a cellular mobile communication connection with the cellular mobile communication network. If the first device has an available SIM card currently, in order to reduce the interference of the first device's available SIM card, the SIM card of the first device is set as the deactivated state when the first device uses the SIM card information of the second device for communication. At this time, the SIM card of the first device may be set as the deactivated state through a deactivation operation.

In an example, the first device cannot share the SIM card information of the second device if the first device has not entered the Share-SIM client mode currently.

In an example of the present disclosure, the deactivation operation may be achieved by performing power down processing on the available SIM card of the first device. As an example, the available SIM card of the first device may include a power pin that can be used by the power source of the first device to supply power to the SIM card.

In another example of the present disclosure, any deactivation operation may be implemented by applying a reset signal for deactivation to the available SIM card of the first device. For example, the available SIM card of the first device has a reset pin, and the SIM card of the first device is deactivated if a reset signal of a first level is applied to the reset pin. If a reset signal of a second level is applied to the reset pin, the SIM card of the first device is activated. The first level is higher than the second level.

In some examples, in the case that the first device is a multi-card device that is allowed to install multiple SIM cards, if one of the SIM cards and the second device's SIM card shared to the first device belong to the same communication provider, the first device needs to deactivate the SIM card belong to the communication provider same as the communication provider of the shared SIM card. For example, the first device is installed with both a SIM card from China Mobile and a SIM card from China Unicom, and the current communication provider of the shared SIM card of the second device is China Mobile, then the first device needs to deactivate the SIM card from China Mobile, rather than deactivating both the SIM card from China Mobile and the SIM card from China Unicom.

In some examples, the method further includes: activating the SIM card in the deactivated state in the first device in response to the first device exiting the client mode.

If the first device has a deactivated SIM card after entering the client mode, then, after exiting the client mode, the currently deactivated SIM card is automatically activated. Accordingly, the local SIM card of the first device enters into a working state where it is allowed to perform the cellular mobile communication, and it is no longer necessary to share the SIM on another device for performing the cellular mobile communication.

In the examples of the present disclosure, when the first device exits the client mode, it can automatically activate the SIM card without requiring a special activation instruction. This reduces user's operations and improves the intelligence and user satisfaction of the first device.

Apparently, after exiting the client mode, if the first device receives a user instruction for deactivating at least one SIM card in the first device from the human-computer interaction interface again, the first device will deactivate one or more SIM cards in the first device according to the user instruction.

If the SIM card of the first device is deactivated due to de-energizing at the power pin, it can be activated by being supplied with power.

If the SIM card of the first device is deactivated by applying a reset signal of the first level on the reset pin, it can be activated by being applied with a reset signal of the second level at the reset pin thereof.

In some examples, the method further includes:
in response to the first device's requirements for obtaining the cellular mobile communication, determining whether a preset connection is established between the first device and the second device;
in response to determining that the preset link is not established between the first device and the second device, triggering a corresponding module to establish the preset connection.

In order to ensure successful information sharing between the first device and the second device, it is necessary to establish the preset connection between the first device and the second device, and establish an interactive channel between the first device and the second device through the preset connection.

For example, the preset connection includes at least one of the following:
a Bluetooth connection;
a Wi-Fi direct connection;
a network connection in the same Wi-Fi local area network (LAN);
a device-to-device (D2D) connection.

In the examples of the present disclosure, the interactive channel may be any link that connects the first device and the second device other than the cellular mobile communication.

The Bluetooth connection includes: a classic Bluetooth connection and/or a low energy (LE) Bluetooth connection. In some cases, the first device and the second device may be in a single Bluetooth mode or a dual Bluetooth mode. If they are in the single Bluetooth mode, the first device may only perform the classic Bluetooth connection or the LE Bluetooth connection. If they are in the dual Bluetooth mode, the first device can perform the classic Bluetooth connection and the LE Bluetooth connection at the same time.

In some examples, the Wi-Fi direct is a peer-peer connection based on Wi-Fi transmission technology, which has the characteristics of long connection distance and large bandwidth.

In some examples, D2D communication is a device-to-device proximity service-based communication.

The network connection in the same Wi-Fi local area network includes: a network connection through the same Wi-Fi access point (AP).

In some other examples, the first device and the second device may also establish, based on another relay device other than the AP, any network connection different from the cellular mobile communication network.

To sum up, the above solutions are examples of the preset connection, and the specific implementation is not limited to the above examples.

Figure 3:
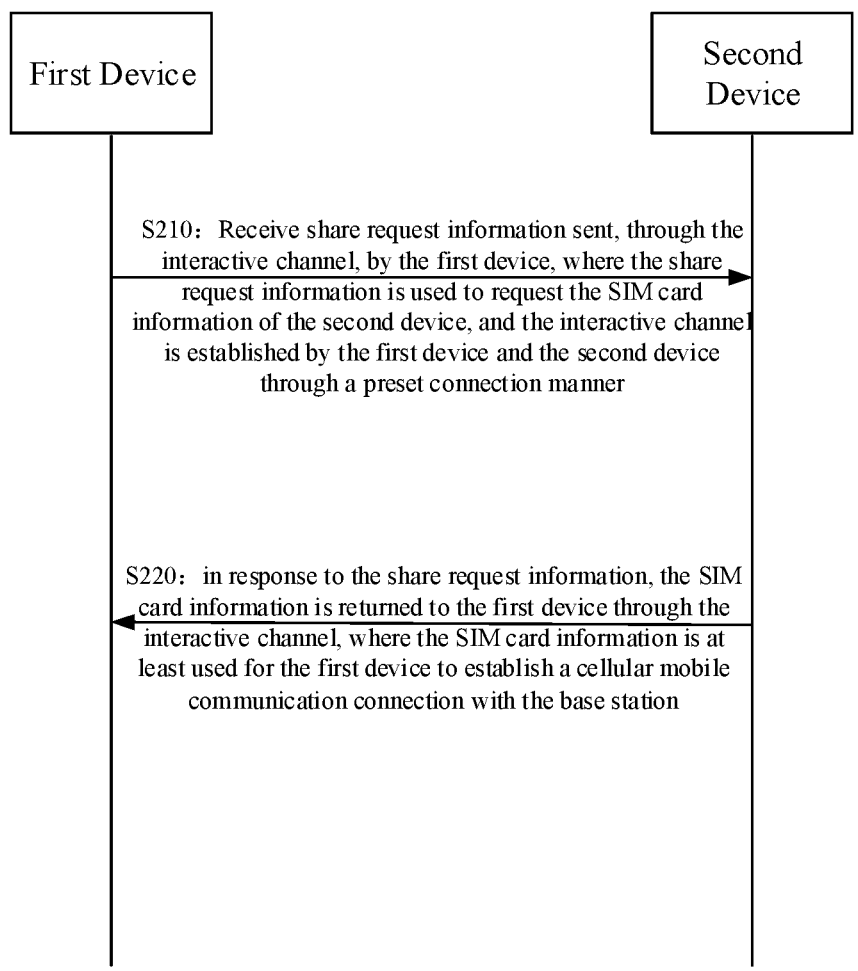
FIG. 3 is a schematic flowchart of a SIM card sharing method according to one or more examples of the present disclosure.

As shown in FIG. 3, examples of the present disclosure provide a SIM card sharing method applied to a second device, and the method includes steps described below.

In S210, share request information sent, through the interactive channel, by the first device is received, where the share request information is used to request the SIM card information of the second device, and the interactive channel is established between the first device and the second device through a preset connection manner.

In S220, in response to the share request information, the SIM card information is returned to the first device through the interactive channel, where the SIM card information is at least used for the first device to establish a cellular mobile communication connection with the base station.

In the examples of the present disclosure, the second device may be a communication device installed with an available SIM card. The device type of the second device may include: a mobile phone, a tablet phone, a phone watch, a vehicle-mounted device, or other communicable devices.

In the examples of the present disclosure, if the first device needs to share the SIM card information of the second device, it will send the share request information for sharing the SIM card to the second device on the interactive channel.

After receiving the share request information, the second device will return its own SIM card information to the first device. The SIM card information includes at least: information required for sending a network access request when the first device requests to access the network. For example, the SIM card information required for the first device to request to access the network includes at least the IMSI of the SIM card of the second device.

In some examples, the SIM card information may further include: SIM card information required by the first device to perform authentication with the network side after requesting to access the network. For example, the SIM card information may include: the SIM card information used for generating the authentication response, such as Ki of the SIM card in the second device.

In summary, in the examples of the present disclosure, the second device can share its own SIM card information with the first device through an interactive channel. Thus, the object of sharing the SIM card information of the second device with the first device can be achieved without manually extracting the SIM card of the second device and installing it in the first device, which expands the capabilities and scenarios of cellular mobile communication of the first device, and improves the intelligence of the first device and the second device.

The SIM card information may be specifically used by the first device to send a network access request to the network.

Figure 4:
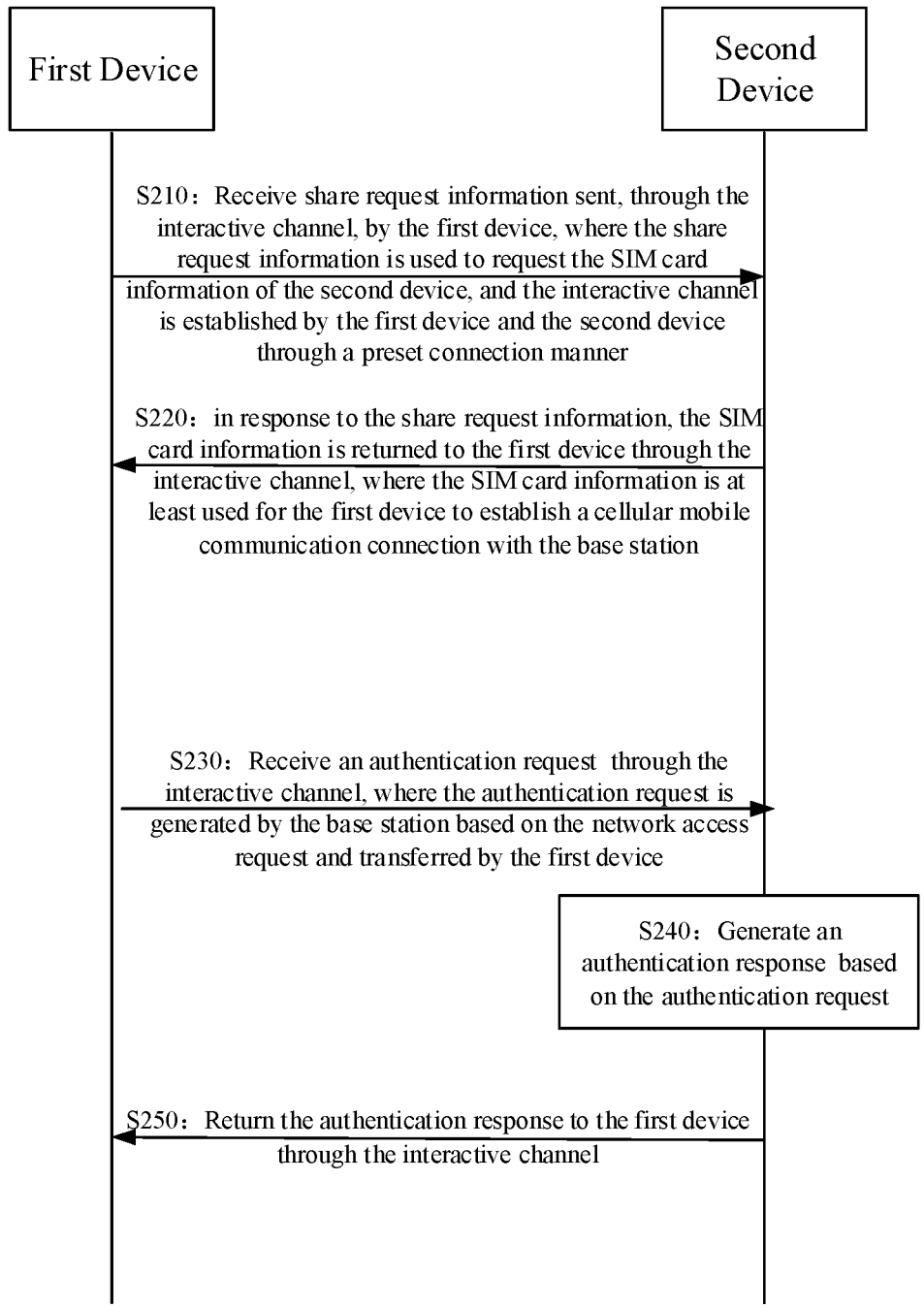
FIG. 4 is a schematic flowchart of a SIM card sharing method according to one or more examples of the present disclosure.

In some examples, the method further includes the following steps, as shown in FIG. 4.

In S230, an authentication request is received through the interactive channel, where the authentication request is generated by the base station based on a network access request and transferred by the first device.

In S240, an authentication response is generated based on the authentication request.

In S250, the authentication response is returned to the first device through the interactive channel.

The authentication response is used by the first device to perform authentication verification of the cellular mobile communication connection with the base station.

In order to ensure the security of the SIM card information of the second device, the second device can only transfer a part of its own SIM card information to the first device. Therefore, it is also necessary for the second device to perform authentication with the network side. Instead of achieving the authentication through directly interacting information with the network side by the second device itself, in the examples of the present disclosure, the authentication request and/or the authentication response involved in the authentication process is/are transferred by the first device.

In some examples, in order to speed up the network access of the first device and enable the first device to perform the cellular mobile communication faster by using the SIM card information of the second device, the second device may send all the SIM card information to the first device. In this case, the SIM card information is also used by the first device to generate an authentication response.

The authentication response is used by the first device and the base station to perform authentication verification of the cellular mobile communication connection. In particular, the authentication response may be specifically used in the authentication verification process to reply to the authentication request returned after the first device sends the network access request based on the SIM card information. After receiving the authentication response, the base station will perform authentication verification. If the authentication verification is passed, the network side will allow the first device to: register to the network with the SIM card information of the second device, and establish a cellular mobile communication connection with the base station.

For example, the SIM card information shared with the first device by the second device may include SIM card information required by the first device to generate an authentication response, then the first device may generate an authentication response by itself based on the SIM card information shared by the second device.

In some examples, the method further includes: determining whether it is allowed to share the SIM card information of the second device. Step S210 is performed only if it is allowed to share the SIM card information of the second device.

As an example, in some examples, the determining whether it is allowed to share the SIM card information of the second device may include: determining whether the second device enters a Share-SIM server mode.

Accordingly, the S210 may include: in response to the second device entering the server mode, returning, through the interactive channel, the SIM card information to the first device based on the request information.

As an example, the second device may be installed with a sharing code such as an application (APP) used for sharing a SIM card. The sharing code can determine, based on an instruction, whether the second device enters the Share-SIM server mode.

In some examples, the client mode mentioned in the foregoing examples and the server mode mentioned here may be two different work modes of sharing the SIM card. The device in the client mode receives SIM card information shared by other devices; the device in the server mode shares its own SIM card information with other devices.

In some examples, the aforementioned sharing code such as APP used for sharing the SIM card information can control a device to enter the server mode or the client mode once being installed. That is, at one moment, a device can enter the Share-SIM server mode, and at other moments, the device can also enter the Share-SIM client mode.

In the examples of the present disclosure, before sharing the SIM card information of the second device with the first device, it is determined whether the first device enters the Share-SIM server mode. If the second device enters the Share-SIM server mode, it is equivalent to confirming that the second device agrees to share the SIM card information thereof with other devices.

No doubt that determining whether it is allowed to share the SIM card information of the second device with other devices may further include: receiving a sharing command from the user interface by the second device; and/or, receiving a sharing request from the first device, where the first device and the second device have a history sharing record or a preset sharing negotiation.

In some examples, when the second device receives a sharing request from the first device that has a history sharing record or a preset sharing negotiation with the first device, it is determined that the first device is allowed to share the SIM card information.

In some examples, the method further includes: deactivating the SIM card of the second device after the second device enters the server mode.

In order to reduce the communication abnormalities caused by simultaneously performing, based on the same SIM card information, cellular mobile communication by the first device and the second device, after the second device enters the server mode, the second device's SIM card shared with the first device can be set as the deactivated state. The SIM card of the second device can be set as the deactivated state through a deactivation operation. The deactivation operation here may include: disconnecting the power supply to the SIM card of the second device or applying a reset signal of the first level to the reset pin of the second device.

In some examples, the second device can immediately deactivate the SIM card shared with the first device after entering the server mode. In this way, the sharing of the shared SIM card needs to be realized immediately.

In other examples, after entering the server mode and receiving the sharing SIM card request information sent from the first device, the second device may read the SIM card information from the SIM card of the second device, and then deactivate the shared SIM card. In this way, when the first device has not shared the SIM card of the second device, the second device may continue to use the unshared SIM card for communication.

In some examples, the method further includes: activating the deactivated SIM card of the second device after the second device exits the server mode.

If the second device exits the server mode, the SIM card set in the deactivated state in the second device can be automatically activated, so that the second device can use the SIM card information that has not been shared any more for cellular mobile communication in the future.

In the example of the present disclosure, the second device autonomously activates the SIM card in the deactivated state after exiting the server mode, thus there is no need for user operations, causing the characteristics of high intelligence.

In some examples, the method further includes: after the second device enters the server mode, determining whether the interactive channel between the second device and the first device has been established; in response to having not established the interactive channel between the second device and the first device, establishing the interactive channel between the second device and the first device.

In this example, the interactive channel is established through a preset connection manner. The establishment of the interactive channel has been described above, and will not be repeated here.

The examples of the present disclosure provide a SIM card sharing method, which can be applied to a client (the client may include: a PAD and/or a mobile phone) that currently supports communication functions of a modem. If no SIM card is inserted into the client, or when a SIM card is inserted and the data traffic is limited, the terminal can share the SIM card of other servers through the SIM card sharing technology, i.e., "virtually moving the SIM card", without plugging or unplugging any physical SIM card, so that the terminal can use the SIM card of another terminal to access the network and/or make calls.

Figure 5:
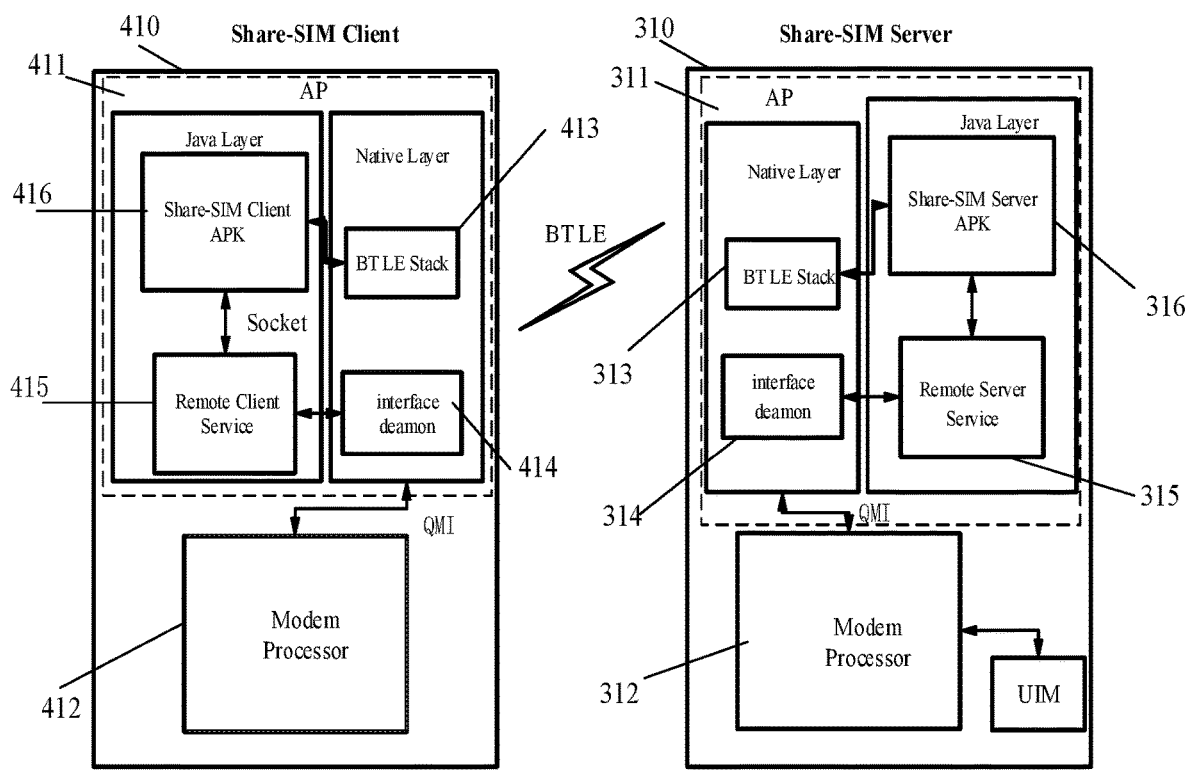
FIG. 5 is a schematic flowchart of a SIM card sharing method according to one or more examples of the present disclosure.

As shown in FIG. 5, an example of the present disclosure provides a schematic diagram illustrating a framework of a client 410 and a server 310.

The server 310 includes two processors:
  an application processor 311, used for information processing at the application layer; and
  a modem processor 312, used for data processing of a modem.

The application processor 311 and the modem processor 312 exchange information through a multi-processor inter-process communication interface (or called as a general interface). The interface may be a Qualcomm Message Interface (QMI) as shown in FIG. 5. QMI is generally used for communication between chips produced by Qualcomm Inc.

The application processor 311 operates on the application layer, and the modem processor 312 can operate on the physical layer.

Both the application processor 311 and the modem 312 have codes, and the communication between the physical layer and the application layer is realized through the execution of these codes. These codes include, but are not limited to: applications at the application layer, middleware layer and/or driver code, etc.

Similarly, the client 410 also includes an application processor 411 and a modem processor 412.

Description is made by taking a situation that the client 410 and the server 310 are Android devices as an example.

The client 410 includes a Java layer and a Native layer, and communicates with a modem through a multi-processor inter-process communication interface such as QMI.

The code used by the Native layer can usually be code written in C language.

The Java layer may be code written in Java.

The Native layer and the Java layer can call each other through the JNI (Java Native Interface) mechanism.

As an example, the Share-SIM client 410 further includes: a Share-SIM client APK (Android Package) 416, a remote client service 415, a daemon 414, and a Bluetooth Low Energy (BT LE) stack 413.

The Share-SIM client APK 416, the remote client service 415, the daemon 414 and the BT LE stack 413 are all running on the application processor (AP) 411 of the client 410.

As an example, the Share-SIM server 310 further includes: a Share-SIM server Android Package (APK) 316, a remote server service 315, a daemon 314, and a Bluetooth Low Energy (BT LE) stack 313.

The Share-SIM server Android Package (APK) 316, the remote server service 315, the daemon 314 and the BT LE stack 313 are all running on the application processor (AP) 311 of the server 310.

The code for sharing SIM card information runs on the Java layer. The code may include code supporting the server and code supporting the client. Exemplarily, the code supporting the server may include the Share-SIM server Android Package (APK) 316. The client also includes the remote client service 315, which calls the daemon (interface daemon) 314 of the Native layer through a socket. If the client shares another device's UIM card, the remote client service can be a UIM remote client service. Correspondingly, the server runs a remote server service 415.

If the connection for exchanging SIM card information between the client 410 and the server 310 is the Bluetooth LE connection, the Native layers of the server 310 and the client 410 run BT LE stacks 313 and 314 respectively, so that Bluetooth LE data packets that need to be interacted between the server 410 and the client 310 to be pushed into the stack or poped from the stack. The content carried in the Bluetooth data packet includes at least the aforementioned SIM card information. In some cases, the content carried in the Bluetooth data packet interacted through the Bluetooth connection may also include: an authentication request and/or an authentication response.

A connection is established between the modem 311 and the SIM card of the server 310, so that at least the SIM card information of the SIM card can be read.

Related operations of the client 410 and the server 310 during sharing the SIM card are introduced respectively below.

The client performs initial preparation, and the initial preparation of the client may include:
  opening the Share-SIM client App, enabling the Bluetooth connection, and establishing a Bluetooth connection with the server device; and
  enabling the share-SIM Client mode.

After completing the initial preparations, the Share-SIM client App issues a request to open the command to the underlying modem;
  determining by the modem whether there is a physical card (i.e., the SIM card) currently running, and if so, power down the physical card.

The modem sends "RESET" command to the Share-SIM client App to initialize the Share-SIM.

The Share-SIM client App sends the "RESET" command (CMD) to the server, and the server replies "Answer To Reset (ATR)" CMD to the client app.

The RESET command can follow the instructions of the SIM card communication specification, and can be used to initialize the sharing identification module client APP.

The Share-SIM client App sends the received ATR to the Modem, and then the Modem reads other initialization files, for example EF files such as EFICCID files and EFIMSI files, through the channel established by the Share-SIM client App and the Server. After the EF file related to the initialization is read, the initialization of the SIM card is completed.

The EFICCID file carries at least the ICCID of the SIM card. The EFIMSI file at least carries the IMSI of the SIM card.

The underlying Modem reports an event of being ready to share a SIM card ("READY") to the Share-SIM client App, and the Client App sends the report to the server. So far, the share-SIM card is loaded.

The share-SIM card may access to the network through the operation described below.

The Share-SIM client App requests access to the network, reads the IMSI from the server through the established channel and sends the IMSI to the Modem.

The Modem carries IMSI to send a network access request to base station. The network access request carries the IMSI.

The base station replies with an authentication request carrying parameters such as authentication token (AUTN) and random number (RAND).

The authentication request is sent, through the Share-SIM client App, to the server by the Modem to perform authentication operation.

The server sends an authentication result RES to the Modem of the client, and the Modem sends the RES to the base station. At this point, the authentication on the network accessing is completed.

The de-energizing of the Share-SIM card may include operations described below.

When the Share-SIM card is to be turned off, the Share-SIM client App is controlled, based on the user input received by the UI interface, to send a "Power Down" command request to the Modem.

The Modem performs the de-energizing processing of the Share-SIM card (that is, the shared SIM card).

After receiving a de-energizing command for the shared SIM card, the Modem stops using the SIM card information of the SIM card (to achieve a similar effect of powering down the shared SIM card), and determines whether there is a physical card to be activated in the card slot currently.

If there is a SIM card to be activated in the card slot, the physical card of the current client will be automatically activated. The physical card here is different from the Share-SIM card, which can be a SIM card that is deactivated when the device uses the Share-SIM card.

After stopping using the shared SIM card information, the Modem will send "Power Down Success" to the client APK of the Share-SIM card to notify the completion of the de-energizing of the Share-SIM card. The de-energizing of the Share-SIM card here actually means a process of not continuing to share the SIM card information of another device.

Disconnecting can include:
  sending, by the client APK of the shared SIM card (i.e., the Share-SIM client App), a "Power Down" event to the server, and disconnecting the Bluetooth connection with the server.

Related operations for sharing SIM card information on the server can include operations described below:

opening the Share-SIM server APK (i.e., the Share-SIM Server App); and enabling the Bluetooth connection and establishing a Bluetooth connection with the client device.

Initiating the Share-SIM server mode can include:

issuing, by the Share-SIM Server App, "Enter Server mode" to the Modem to inform the Modem to enter the Server mode.

After receiving "Enter Server mode", the Modem determines whether there is an activated physical card. If there is an activated physical card, the Modem deactivates the activated physical card, and causes the deactivated SIM card to enter the server mode.

An event of the server mode being ready, that is "Server mode ready", is sent back to the Share-SIM Server App.

The Share-SIM Server App sends the received Ready event to the client.

The client sends "RESET CMD" to the Share-SIM Server App to start an initialization process of the Share-SIM.

The Share-SIM Server App sends RESET to the Modem.

The Modem sends the RESET CMD to the shared physical card, and the physical card replies with the "ATR CMD" command to the Share-SIM Server App. The Server APP sends the ATR CMD to the client. The ATR CMD here is a command to reply to RESET CMD.

Through the channel established by the Server and the client, all card files about the initialization process of the SIM card, for example EF files such as EFICCID files and EFIMSI files, are read. The information in the EF files here is the aforementioned SIM card information.

The client sends a "SIM Ready" event to the Server App after completing the initialization of the Share-SIM card, and the server APP transfers this event to the Modem.

At this point, the server supports the client to complete the SIM card initialization through the established Bluetooth connection.

The Share-SIM card may access to the network by:

transferring, by the client, the authentication request issued by the network during accessing the network; the authentication request being carried with AUTN and RAND;

transferring, by the Share-SIM server APK (i.e., the Server app), the authentication request to the Modem;

sending, by the Modem, the authentication request to the shared physical card to complete the authentication operation by the shared physical card and obtain the authentication result RES, and returning the RES to the Server app.

The Server app returns the authentication result to the client. At this point, the network registration is completed by the client under the cooperation of the server.

The de-energizing of the Share-SIM card may include operations described below.

The client sends the power down command "power down" to the server.

The Server app transfers the event to the Modem, and the Modem completes the de-energizing operation of the Share-SIM card, and sends 'Power Down OK' back to the Server app. The server sends the event back to the client to notify that the de-energizing is completed.

The Modem reenergizes the physical card that is de-energized.

The disconnection may include: disconnecting, by the Share-SIM server APK, the Bluetooth connection with the client, thereby removing the Bluetooth connection.

Figure 6:
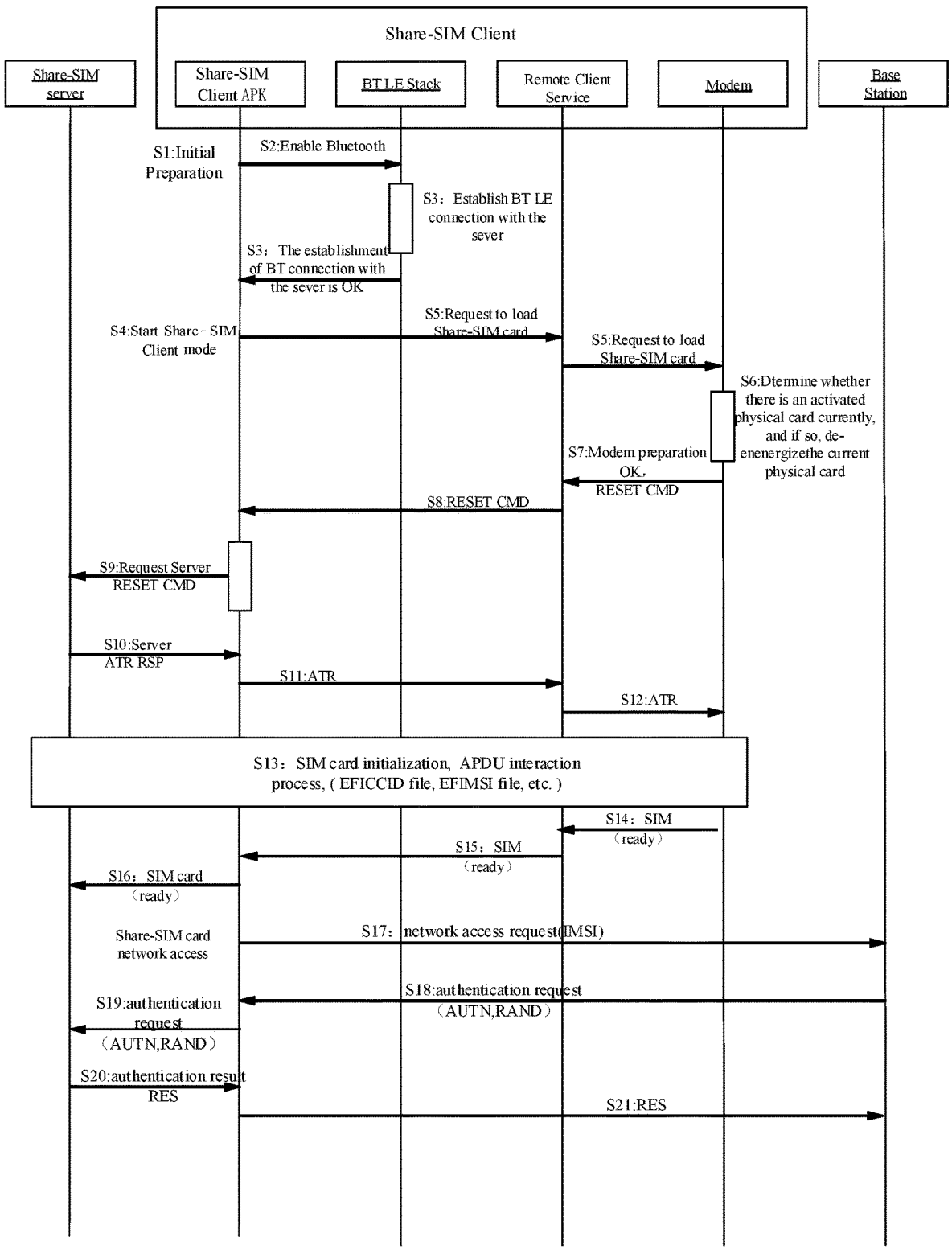
FIG. 6 is a schematic flowchart of a SIM card sharing method at a client side according to one or more examples of the present disclosure.

As shown in FIG. 6, the client's related operations for sharing SIM card information may include:

S1: Initial preparation;

S2: Open the Share-SIM client App and enable Bluetooth;

S3: Establish a Bluetooth connection with the server device; and notify the Share-SIM client APK by the BT LE stack when the establishment of the Bluetooth connection is ok;

S4: Enable a Share-SIM Client mode (that is, the aforementioned client mode of the shared SIM card);

S5: Request to load Share-SIM card;

S6: Determine whether a physical card (i.e., the aforementioned SIM card) is currently activated, if so, de-enenergize the current physical card;

S7: Modem is ready, RESET CMD, where Modem sends "RESET" command to the Share-SIM client App to initialize Share-SIM;

S8: send, by the remote client service, RESET CMD to the Share-SIM client APK;

S9: Request RESET CMD on the server;

S10: Server ATR RSP, where ATR RSP is the reply response, which is the abbreviation of Answer To Reset;

S11: The Share-SIM server APK sends the ATR to the remote client service;

S12: The remote client service sends ATR to the Modem;

S13: SIM card initialization, application protocol data unit (APDU) interaction process, the contents involved during the interaction process may include: EFICCID file, EFIMSI file, etc. Both the EFICCID file and the EFIMSI file here belong to the aforementioned SIM card information. The EFICCID file at least carries the ICCID of the SIM card. The EFIMSI file at least carries the IMSI of the SIM card.

S14: The Modem notifies the remote client service that the SIM card is ready;

S15: The remote client service notifies the Share-SIM client APK that the SIM card is ready;

S16: The Share-SIM client APK notifies the Share-SIM card server that the SIM card is ready;

S17: The Share-SIM client APK sends a network access request carrying the IMSI of the shared SIM card;

S18: an authentication request returned by the base station is received, where the authentication request carries an authentication token (AUTN) and a random number (RAND);

S19: The Share-SIM client APK sends the authentication request to the Share-SIM server;

S20: The Share-SIM client APK receives the authentication result RES returned from the Share-SIM server, where RES is an abbreviation of authentication response.

S21: The Share-SIM client APK sends the RES to the base station.

Figure 7:
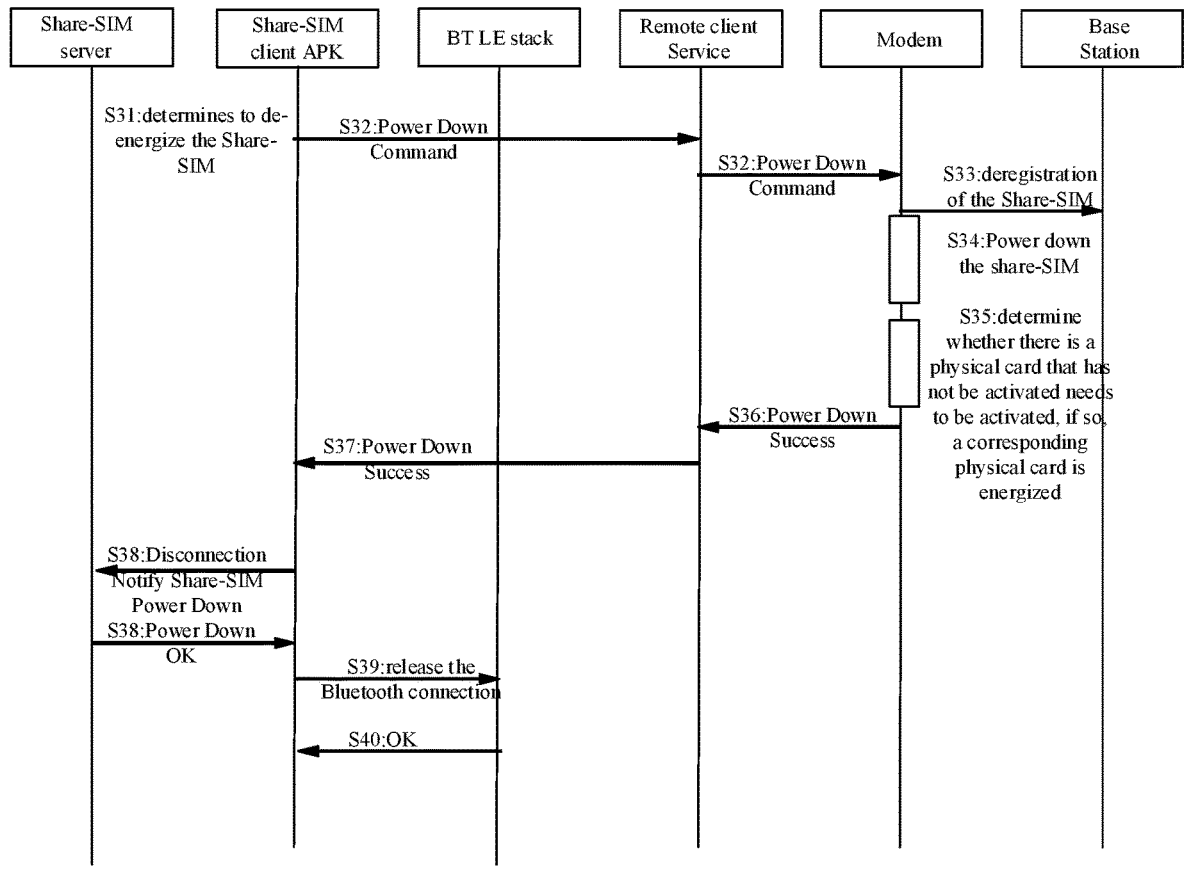
FIG. 7 is a schematic flowchart of a method for de-energizing Share-SIM according to one or more examples of the present disclosure.

As shown in FIG. 7, a detailed process of de-energizing the shared SIM card (i.e., the Share-SIM card as shown in FIG. 7) may include steps described below.

In S31, the Share-SIM client APK determines to de-energize the Share-SIM.

In S32, a power down command is sent to the remote client service.

In S33, the remote client service sends the power down command to the modem.

In S34, the modem initiates to deregistration of the Share-SIM to the base station.

In S35, the modem determines whether there is a physical card that has not be activated needs to be activated, if so, a corresponding physical card is energized.

In S36, the power down succeeds (Power Down Success).

In S37, the Share-SIM client APK notifies the Share-SIM server that the connection is broken (Notify Share-SIM Power Down).

In S38, the Share-SIM client APK receives the power down reply (Power Down OK) from the Share-SIM server.

In S39, the Share-SIM client APK informs the BL TE stack to release the Bluetooth connection.

In S40, the BL TE stack reply confirmation (OK).

Figure 8:
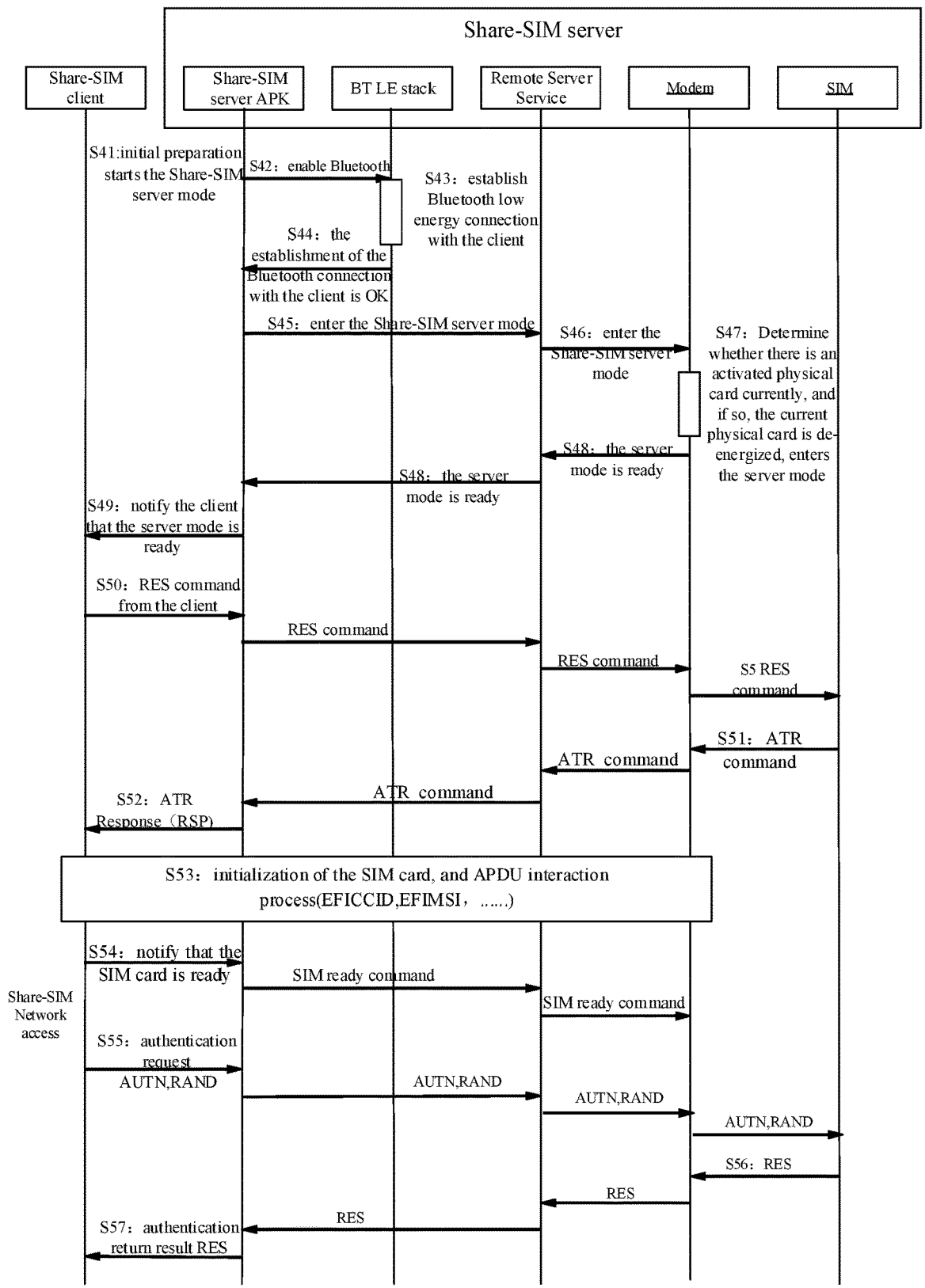
FIG. 8 is a schematic flowchart of a SIM card sharing method at a server side according to one or more examples of the present disclosure.

As shown in FIG. 8, the related operations of sharing SIM card information at the server can be the following operations.

In S41, the Share-SIM server APK performs initial preparations, and starts the Share-SIM server mode.

In S42, the Bluetooth is enabled.

In S43, a Bluetooth low energy connection with the client is established.

In S44, the BT LE stack notifies the Share-SIM server that the establishment of the Bluetooth connection with the client is OK.

In S45, the Share-SIM server APK notifies the remote server service to enter the Share-SIM server mode.

In S46, the remote server service notifies the modem to enter the Share-SIM server mode.

In S47, the modem determines whether there is an activated physical card currently, and if so, the current physical card is de-energized, the modem enters the server mode.

In S48, the server mode is ready.

In S49, the Share-SIM server APK notifies the client that the server mode is ready.

In S50, a RES command from the client is received and transmitted to the SIM card.

In S51, an ATR command is generated.

In S52, the Share-SIM server APK sends an ATR response (RSP) to the client according to the ATR command.

In S53, the SIM card is initialized, and APDU interaction process is executed.

In S54, it is notified by the client that the SIM card is ready (SIM ready), and the SIM ready command is transmitted to the modem.

In S55, an authentication request carrying AUTN and RAND is received, and the AUTN and RAND is transmitted to the SIM card.

In S56, the SIM card generates an authentication response (RES) and transfers it to the Share-SIM server APK.

In S57, the Share-SIM server APK sends an authentication return result to the client, and the authentication return result carries the RES.

Figure 9:
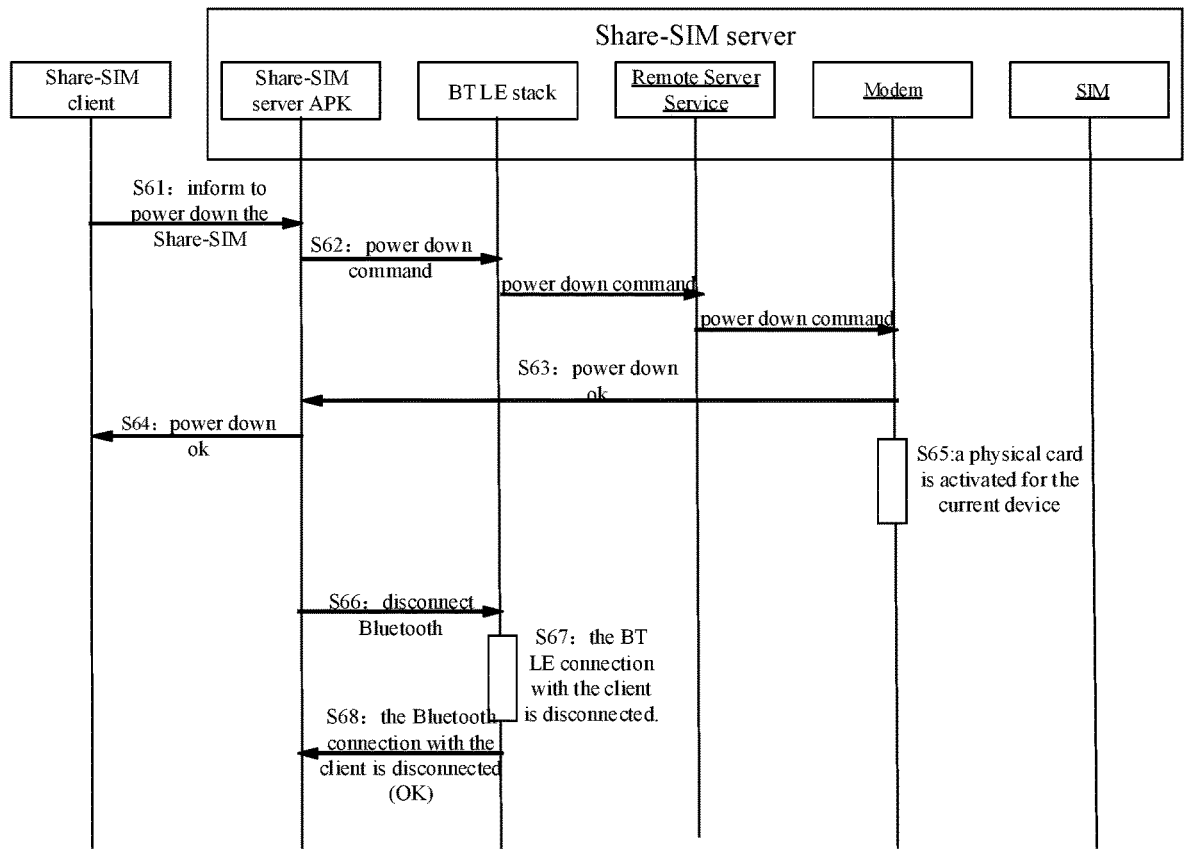
FIG. 9 is a schematic flowchart of a method for de-energizing Share-SIM according to one or more examples of the present disclosure.

As shown in FIG. 9, related operations of de-energizing the Share-SIM on the server (that is, stopping sharing the SIM card) are described below.

In S61, the Share-SIM server APK is informed to power down the Share-SIM.

In S62, the power down command is transmitted to the modem.

In S63, the power down is confirmed (power down ok).

In S64, the power down ok is sent to the Share-SIM client.

In S65, a physical card is activated for the current device, and the physical card can be the SIM card that was previously shared.

In S66, the Share-SIM server APK informs the BT LE stack to disconnect Bluetooth connection.

In S67, the Bluetooth low energy connection with the client is disconnected.

In S68, it is confirmed that the Bluetooth connection with the client is disconnected (OK).

Figure 10:
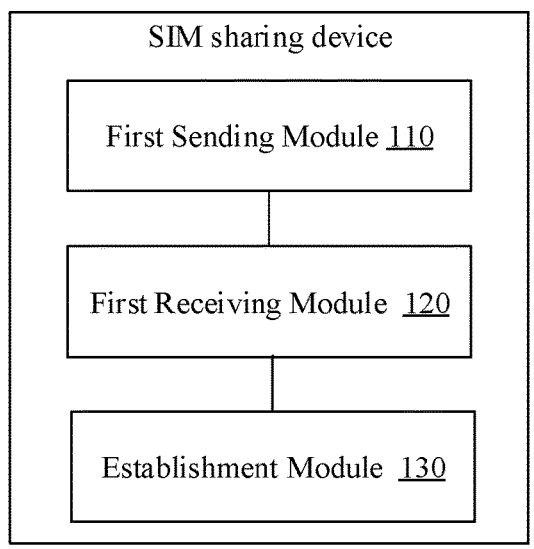
FIG. 10 is a schematic structural diagram illustrating a SIM card sharing device according to one or more examples of the present disclosure.

As shown in FIG. 10, an example of the present disclosure provides a SIM card sharing device, which is applied to a first device. The first device and a second device establish an interactive channel through a preset connection manner. The SIM card sharing device includes: a first sending module 110, a first receiving module 120, and an establishment module 130.

The first sending module 110 is configured to send, through the interactive channel, share request information to the second device in response to the first device's requirement for obtaining cellular mobile communication. The interactive channel is a wireless connection different from the cellular mobile communication connection.

The first receiving module 120 is configured to receive SIM card information that is returned by the second device based on the share request information.

The establishment module 130 is configured to establish a cellular mobile communication connection with the base station according to the SIM card information returned by the second device.

In some examples, each of the first sending module 110, the first receiving module 120, and the establishment module 130 may include program modules. The program modules, when executed by a processor, can realize the above operations such as sending request information for requesting SIM card information, receiving SIM card information, and generating and reporting the authentication response.

In some other examples, each of the first sending module 110, the first receiving module 120, and the establishment module 130 may include a module integrated with software and hardware. The module integrated with software and hardware includes, but is not limited to various programmable array. The programmable array includes, but is not limited to: a field programmable array and/or a complex programmable array.

In some other examples, each of the first sending module 110, the first receiving module 120, and the establishment module 130 may include pure hardware modules, and the pure hardware module includes, but is not limited to the application-specific integrated circuit.

In some examples, the first sending module is further configured to send a network access request to the base station based on the SIM card information. The first receiving module is configured to receive an authentication request that is returned from the base station based on the network access request. The establishment module includes a first sending submodule.

The first sending submodule is configured to: acquire the authentication response based on the authentication request, send the authentication response to the base station. The authentication response is used to allow the first device to establish a cellular mobile communication connection with the base station in response to the authentication response passing an authentication verification.

In some examples, the establishment module 130 further includes:
 a second sending submodule, configured to transfer the authentication request to a second device through the interactive channel; and
 a first receiving submodule, configured to: receive the authentication response that is returned by the second device based on the authentication request; or generate the authentication response based on the SIM card information and the authentication request.

In some examples, the situations where the first device has cellular mobile communication requirements include at least one of the following:
 the first device enters a Share-SIM client mode;

the first device receives a sharing command for sharing a SIM card;
an instruction to perform cellular mobile communication is received by the first device when there is no available SIM card in the first device.

In some examples, the situation that there is no available SIM card in the first device includes the following scenarios:
no SIM card is installed in the first device;
the SIM card installed in the first device is in a deactivated state;
the SIM card installed in the first device breaks down;
the SIM card installed in the first device is not registered.

In some examples, the SIM card sharing device further includes:
a determination module, configured to determine whether there is an available SIM card in the first device in response to the first device entering the Share-SIM client mode; and
a deactivation module, configured to: in response to determining that there is an available SIM card in the first device, deactivate the available SIM card in the first device.

In some examples, the SIM card sharing device further includes:
a first activation module, configured to activate the SIM card in the deactivated state in the first device in response to the first device exiting the client mode.

In some examples, the SIM card sharing device further includes:
a second determination module, configured to determine whether the interactive channel is established between the first device and the second device in response to the cellular mobile communication requirement of the first device; and
a first establishment module, configured to establish the interactive channel in response to determining that the interactive channel has not been established between the first device and the second device.

In some examples, the preset connection includes at least one of the following:
a Bluetooth connection;
a Wi-Fi direct connection;
a network connection in the same Wi-Fi LAN;
a device-to-device (D2D) connection.

Figure 11:
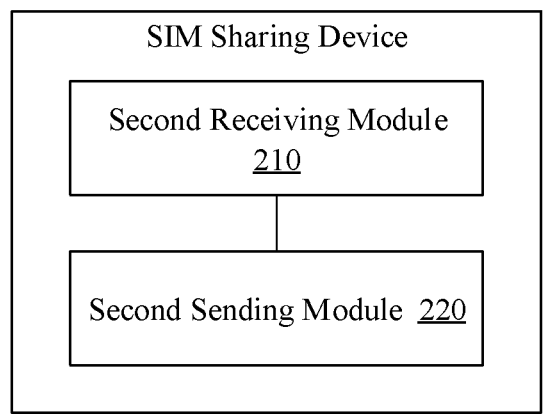
FIG. 11 is a schematic structural diagram illustrating a SIM card sharing device according to one or more examples of the present disclosure.

As shown in FIG. 11, an example of the present disclosure provides a SIM card sharing device applied to a second device. The SIM card sharing device includes modules described below.

A second receiving module 210 is configured to receive share request information sent, through the interactive channel, by the first device, where the share request information is used to request the SIM card information of the second device. The interactive channel is established between the first device and the second device through a preset connection manner.

A second sending module 220 is configured to: return the SIM card information to the first device through the interactive channel in response to the share request information, where the SIM card information is at least used by the first device to establish a cellular mobile communication connection with the base station.

In some examples, the second receiving module 210 and the second sending module 220 may include program modules that, when executed by a processor, can achieve the reception of the request information and the transmission of the SIM card information.

In some other examples, both the second receiving module 210 and the second sending module 220 may include a module integrated with software and hardware. The module integrated with software and hardware includes, but is not limited to various programmable array. The programmable array includes, but is not limited to: a field programmable array and/or a complex programmable array.

In some other examples, both the second receiving module 210 and the second sending module 220 may include pure hardware modules, and the pure hardware module includes, but is not limited to the application-specific integrated circuit.

In some examples, the SIM card information is used by the first device to send a network access request to the network.

The second receiving module 210 is further configured to receive the authentication request, where the authentication request is returned by the base station based on the network access request, and transferred by the first device through the interactive channel.

The device further includes: a generating module, configured to generate an authentication response for the first device in response to the authentication request.

The second sending module 220 is configured to return the authentication response to the first device through the interactive channel, where the authentication response is used by the first device to perform authentication verification of the cellular mobile communication connection with the base station.

In some examples, the SIM card information is also used by the first device to generate an authentication response. For example, the SIM card information is also used by the first device to generate the authentication response, where the authentication response is used to reply the authentication request returned after the first device sends a network access request based on the SIM card information.

In some examples, the SIM card sharing device further includes: a third determining module, configured to determine whether the second device enters the Share-SIM server mode.

The second sending module 220 is further configured to: in response to the second device entering the server mode, return, through the interactive channel, the SIM card information to the first device based on the request information.

In some examples, the SIM card sharing device further includes: a second deactivation module, configured to deactivate the SIM card of the second device after the second device enters the server mode.

In some examples, the SIM card sharing device further includes: a second activation module, configured to activate the deactivated SIM card of the second device after the second device exits the server mode.

In some examples, the SIM card sharing device further includes: a fourth determination module, configured to determine whether the interactive channel has been established with the first device after the second device enters the server mode.

The device further includes: a second establishment module, configured to establish the interactive channel with the first device in response to having not established the interactive channel with the first device.

The example of the present disclosure provides a communication device, including:
a memory for storing instructions executable by a processor; and
a processor connected to the memory;

where the processor is configured to execute the SIM card sharing method provided by any of the foregoing technical solutions.

The processor may include various types of storage medium, and the storage medium is a non-transitory computer storage medium that can continue to store information stored thereon after the communication device is powered off.

Herein, the communication device may be the aforementioned first device and/or second device.

The processor can be connected to the memory via a bus to read the executable program stored on the memory. For example, at least one of the methods shown in any of FIGS. 1, 2A, 2B, 2C, 3 to 4, and 6 to 9 can be executed.

Figure 12:
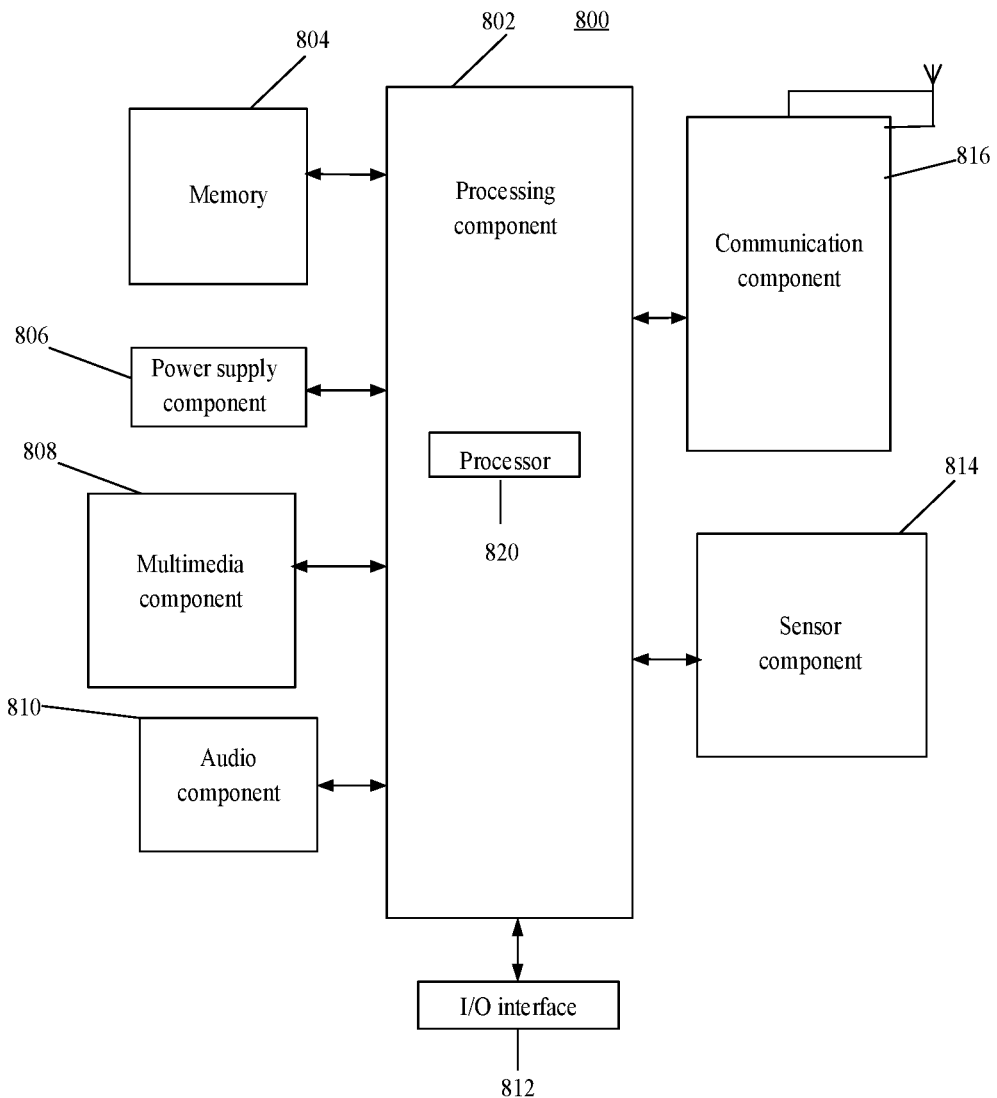
FIG. 12 is a schematic structural diagram illustrating a communication device according to one or more examples of the present disclosure.

FIG. 12 is a block diagram illustrating a communication device 800 according to an example. For example, the communication device 800 may be included in a terminal device such as a mobile phone, a mobile computer, or a server, etc. In short, the data processing communication device 800 may be included in any type of communication device.

Referring to FIG. 12, the communication device 800 may include one or more of the following components: a processing component 802, a memory 804, a power supply component 806, a multimedia component 808, an audio component 810, an input/output (I/O) interface 812, a sensor component 814, and a communication component 816.

Generally, the processing component 802 is configured to control the overall operations of the communication device 800, such as operations associated with displaying, telephone calling, data communications, camera operations, and recording operations. The processing component 802 may include one or more processors 820 to execute instructions to complete all or part of the steps in the foregoing method. In addition, the processing component 802 may include one or more modules to facilitate the interaction between the processing component 802 and other components. For example, the processing component 802 may include a multimedia module to facilitate the interaction between the multimedia component 808 and the processing component 802.

The memory 804 is configured to store various data to support operations of the device 800. Examples of the data include instructions of any application or method that can be run on the communication device 800, contact data, phonebook data, messages, pictures and videos and the like. The memory 804 can be implemented by any type of volatile or non-volatile storage device or their combination, such as static random access memory (SRAM), electrically erasable programmable read-only memory (EEPROM), erasable and Programmable read-only memory (EPROM), programmable read-only memory (PROM), read-only memory (ROM), magnetic memory, flash memory, magnetic disk or optical disk.

The power supply component 806 is configured to supply power to various components of the communication device 800. The power supply component 806 may include a power management system, one or more power supplies, and other components associated with generating, managing, and distributing power for the communication device 800.

The multimedia component 808 includes a screen that provides an output interface between the communication device 800 and the user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touch, swiping, and gestures on the touch panel. The touch sensor may not only sense the boundary of the touch or swipe action, but also detect the duration and pressure related to the touch or swipe operation. In some examples, the multimedia component 808 includes a front camera and/or a rear camera. When the device 800 is in an operation mode, such as a shooting mode or a video mode, the front camera and/or the rear camera can receive external multimedia data. Each front camera and rear camera can be a fixed optical lens system or have focal length and optical zoom capabilities.

The audio component 810 is configured to output and/or input audio signals. For example, the audio component 810 includes a microphone (MIC), and when the communication device 800 is in an operation mode, such as a call mode, a recording mode, and a voice recognition mode, the microphone is configured to receive external audio signals. The received audio signal may be further stored in the memory 804 or transmitted via the communication component 816. In some examples, the audio component 810 further includes a speaker for outputting audio signals.

The I/O interface 812 provides an interface between the processing component 802 and a peripheral interface module. The peripheral interface module may be a keyboard, a click wheel, a button, and the like. The button includes but not limits to a home button, a volume button, a start button and a lock button.

The sensor component 814 includes one or more sensors for providing the communication device 800 with state evaluation in various aspects. For example, the sensor component 814 can detect the on/off state of the device 800 and relative positioning of components, such as the display and keypad of the communication device 800. The sensor component 814 can also detect the position change of the communication device 800 or a component of the communication device 800, the presence or absence of contact between the user and the communication device 800, the orientation or acceleration/deceleration of the communication device 800, and the temperature change of the communication device 800. The sensor component 814 may include a proximity sensor configured to detect the presence of nearby objects when there is no physical contact. The sensor component 814 may also include a light sensor used for imaging application, such as a complementary metal oxide semiconductor (CMOS) or a charge coupled device (CCD) image sensor. In some examples, the sensor component 814 may also include an acceleration sensor, a gyroscope sensor, a magnetic sensor, a pressure sensor or a temperature sensor.

The communication component 816 is configured to facilitate wired or wireless communication between the communication device 800 and other devices. The communication device 800 can access a wireless network based on a communication standard, such as Wi-Fi, 2G, or 3G, or a combination thereof. In an example, the communication component 816 receives a broadcast signal or broadcast related information from an external broadcast management system via a broadcast channel. In an example, the communication component 816 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an example, the device 800 may be implemented by one or more application specific integrated circuits (ASIC), digital signal processors (DSP), digital signal processing devices (DSPD), programmable logic devices (PLD), field programmable gate array (FPGA), a controller, a microcontroller, a microprocessor, or other electronic components, to execute the foregoing method.

In an example, there is further provided a non-transitory computer-readable storage medium including instructions, such as a memory 804 including instructions, which may be executed by the processor 820 of the device 800 to complete the foregoing method. For example, the non-transitory computer-readable storage medium may be a ROM, a random access memory (RAM), a CD-ROM, a magnetic tape, a floppy disk, an optical data storage device, etc.

An examples of the present disclosure provides a non-transitory computer-readable storage medium. When instructions in the storage medium are executed by the processor of the UE, the UE or the base station can execute the SIM card sharing method provided in any of the foregoing examples, and can execute at least one of the methods shown in any of FIG. 1, FIG. 2A, FIG. 2B, FIG. 2C, and FIG. 3 to FIG. 4, FIGS. 6-9.

The SIM card sharing method applied to the first device may include: in response to the first device's requirement for obtaining cellular mobile communication, sending share request information to a second device through an interactive channel, where the interactive channel is established between the first device and the second device through a preset connection manner; receiving the SIM card information returned by the second device based on the share request information; establishing a cellular mobile communication connection with the base station according to the SIM card information returned by the second device.

It can be understood that the establishing a cellular mobile communication connection with the base station according to the SIM card information returned by the second device includes: sending a network access request to the base station according to the SIM card information; receiving an authentication request that is returned by the base station based on the network access request; obtaining an authentication response based on the authentication request; and sending the authentication response to the base station; the authentication response is used to allow the first device to establish a cellular mobile communication connection with the base station in response to the authentication response passing an authentication verification.

It can be understood that the obtaining an authentication response based on the authentication request includes: transferring the authentication request to the second device through the interactive channel, and receiving the authentication response returned by the second device based on the authentication request; or generating the authentication response based on the SIM card information and the authentication request.

It can be understood that the first device's requirements for obtaining cellular mobile communication includes at least one of: the first device entering the Share-SIM client mode; the first device receiving a sharing command for sharing the SIM card; the first device receiving a command to perform cellular mobile communication when there is no available SIM card in the first device.

It can be understood that the situation that there is no available SIM card in the first device includes at least one of the following scenarios: no SIM card is installed in the first device; the SIM card installed in the first device is in a deactivated state; the SIM card installed in the first device breaks down; the SIM card installed in the first device is not registered.

It can be understood that the method further includes: in response to the first device entering the Share-SIM client mode, determining whether there is an available SIM card in the first device; in response to determining that there is an available SIM card in the first device, deactivating the available SIM card in the first device.

It can be understood that the method further includes: activating the SIM card in the deactivated state in the first device in response to the first device exiting the client mode.

It can be understood that the preset connection includes at least one of the following:
a Bluetooth connection;
a Wi-Fi direct connection;
a network connection in a same Wi-Fi LAN;
a device-to-device (D2D) connection.

The SIM card sharing method applied to the second device may include: receiving share request information sent by the first device through an interactive channel, where the share request information is used to request SIM card information of the second device; establishing the interactive channel between the second device and the first device through a preset connection manner; in response to the share request information, returning the SIM card information to the first device through the interactive channel, where the SIM card information is at least used to allow the first device to establish a cellular mobile communication connection with a base station.

It can be understood that the SIM card information is used by the first device to send a network access request to the network, the method further includes: receiving an authentication request through the interactive channel; wherein the authentication request is generated by the base station based on the network access request and transferred by the first device; generating an authentication response for the first device in response to the authentication request; returning the authentication response to the first device through the interactive channel, where the authentication response is used by the first device to perform authentication verification of the cellular mobile communication connection with the base station.

It can be understood that the SIM card information is also used by the first device to generate an authentication response.

It can be understood that the method further includes: determining whether the second device enters a Share-SIM server mode; the returning SIM card information to the first device through the interactive channel based on the share request information includes: in response to the second device entering the server mode, returning, through the interactive channel, the SIM card information to the first device based on the share request information.

It can be understood that the method further includes: deactivating the SIM card of the second device after the second device enters the server mode.

It can be understood that the method further includes: activating the deactivated SIM card of the second device after the second device exists the server mode.

Another aspect of the present disclosure provides a SIM card sharing device that is applied to a first device, and the SIM card sharing device includes:
  a first sending module, configured to: in response to the first device's requirement for obtaining cellular mobile communication, send share request information to a second device through an interactive channel, where the interactive channel is established between the first device and the second device through a preset connection manner;

a first receiving module, configured to receive SIM card information that is returned by the second device based on the share request information;

an establishment module, configured to establish a cellular mobile communication connection with a base station according to the SIM card information returned by the second device.

Yet another aspect of the present disclosure provides a SIM card sharing device that is applied to a second device. The SIM card sharing device includes:

a second receiving module, configured to receive share request information sent, through an interactive channel, by the first device, where the share request information is used to request the SIM card information of the second device, the interactive channel is established between the first device and the second device through a preset connection manner;

a second sending module, configured to: return the SIM card information to the first device through the interactive channel in response to the share request information, where the SIM card information is at least used to allow the first device to establish a cellular mobile communication connection with a base station.

Another aspect of the present disclosure provides a non-transitory computer-readable storage medium, when the instructions in the storage medium are executed by the processor of the computer, the SIM card sharing method provided by any technical solution can be implemented.

Other examples of the present disclosure will be apparent to those skilled in the art from consideration of the specification and practice of the present disclosure disclosed herein. The present application is intended to cover any variations, uses, or adaptations of the present disclosure, which are consistent with the general principles of the present disclosure and include common general knowledge or conventional technical means in the art that are not disclosed in the present disclosure. The specification and examples are illustrative, and the real scope and spirit of the present disclosure is defined by the appended claims.

It should be understood that the present disclosure is not limited to the precise structures that have been described above and shown in the drawings, and various modifications and changes can be made without departing from the scope thereof. The scope of the present disclosure is merely defined by the appended claims.

What is claimed is:

1. A subscriber identification module (SIM) card sharing method, comprising:

in response to a first device's requirement for obtaining cellular mobile communication, sending, by the first device, share request information to a second device through an interactive channel, wherein the interactive channel is established between the first device and the second device through a preset connection manner;

receiving, by the first device, SIM card information that is returned by the second device based on the share request information; and establishing, by the first device, a cellular mobile communication connection with a base station according to the SIM card information returned by the second device, wherein establishing the cellular mobile communication connection with the base station according to the SIM card information returned by the second device comprises:

sending a network access request to the base station according to the SIM card information;

receiving an authentication request that is returned by the base station based on the network access request;

generating an authentication response based on the SIM card information and the authentication request; and sending the authentication response to the base station, wherein the authentication response is configured to allow the first device to establish a cellular mobile communication connection with the base station in response to the authentication response passing an authentication verification.

2. The method according to claim 1, wherein the first device's requirement for obtaining cellular mobile communication comprises at least one of following:

the first device enters a Share-SIM client mode;

the first device receives a sharing command for sharing a SIM card; or the first device receives a command to perform cellular mobile communication when no available SIM card exists in the first device.

3. The method according to claim 2, wherein a situation that no available SIM card exists in the first device comprises at least one of following scenarios:

no SIM card is installed in the first device;

the SIM card installed in the first device is in a deactivated state;

the SIM card installed in the first device breaks down; or the SIM card installed in the first device is not registered.

4. The method according to claim 2, further comprising:

in response to the first device entering the Share-SIM client mode, determining whether an available SIM card exists in the first device; and in response to determining that an available SIM card exists in the first device, deactivating the available SIM card in the first device.

5. The method according to claim 4, further comprising:

activating the SIM card in a deactivated state in the first device in response to the first device exiting the client mode.

6. The method according to claim 1, wherein the preset connection comprises at least one of following:

a Bluetooth connection;

a Wi-Fi direct connection;

a network connection in a same Wi-Fi LAN; or a device-to-device (D2D) connection.

7. A subscriber identification module (SIM) card sharing method, comprising:

receiving, by a second device, share request information sent, through an interactive channel, by a first device, wherein the share request information is configured to request SIM card information of the second device, and the interactive channel is established between the first device and the second device through a preset connection manner; and returning, by the second device, the SIM card information to the first device through the interactive channel in response to the share request information, wherein the SIM card information is at least configured to allow the first device to establish a cellular mobile communication connection with a base station, wherein the SIM card information is configured by the first device to send a network access request to a network, and the method further comprises:

receiving an authentication request through the interactive channel, wherein the authentication request is generated by the base station based on the network access request and transferred by the first device; and sending, by the second device, the SIM card information to the first device, wherein the SIM card information is required by the first device to generate an authentication response, and the first device generates the authentication response based on the SIM card information and the authentication request, wherein the authentication response is configured to allow the first device to perform an authentication verification of the cellular mobile communication connection with the base station.

8. The method according to claim 7, further comprising:
determining whether the second device enters a Share-SIM server mode; and wherein returning the SIM card information to the first device through the interactive channel in response to the share request information further comprises:

in response to the second device entering the server mode, returning, through the interactive channel, the SIM card information to the first device based on the share request information.

9. The method according to claim 8, further comprising:
deactivating the SIM card of the second device after the second device enters the server mode; and activating a deactivated SIM card of the second device after the second device exits the server mode.

10. A subscriber identification module (SIM) card sharing device, applied to a first device and comprising: a processor and a memory, wherein the memory is configured to store a computer program that, when executed by the processor, causes the processor to:

in response to the first device's requirement for obtaining cellular mobile communication, send share request information to a second device through an interactive channel, wherein the interactive channel is established between the first device and the second device through a preset connection manner;

receive SIM card information that is returned by the second device based on the share request information; and establish a cellular mobile communication connection with a base station according to the SIM card information returned by the second device;

wherein the processor is further configured to:

send a network access request to the base station according to the SIM card information;

receive an authentication request that is returned by the base station based on the network access request;

generate the authentication response based on the card information and the authentication request; and send the authentication response to the base station, wherein the authentication response is configured to allow the first device to establish a cellular mobile communication connection with the base station in response to the authentication response passing an authentication verification.

11. The SIM card sharing device according to claim 10, wherein the first device's requirements for obtaining cellular mobile communication comprise at least one of following:

the first device enters a Share-SIM client mode;

the first device receives a sharing command for sharing a SIM card; or the first device receives a command to perform cellular mobile communication when no available SIM card is in the first device.

12. The SIM card sharing device according to claim 11, wherein a situation that no available SIM card exists in the first device comprises at least one of following scenarios:

no SIM card is installed in the first device;

the SIM card installed in the first device is in a deactivated state;

the SIM card installed in the first device breaks down; or the SIM card installed in the first device is not registered.

13. The SIM card sharing device according to claim 11, the processor is further configured to:

determine whether an available SIM card exists in the first device in response to the first device entering the Share-SIM client mode; and in response to determining that an available SIM card exists in the first device, deactivate the available SIM card in the first device.

14. The SIM card sharing device according to claim 13, the processor is further configured to:

activate the SIM card in a deactivated state in the first device in response to the first device exiting the client mode.

* * * * *